US012712315B2

(12) United States Patent
Schipper et al.

(10) Patent No.: US 12,712,315 B2
(45) Date of Patent: Aug. 18, 2026

(54) ELECTRONIC CONNECTION MODULE

(71) Applicant: KONINKLIJKE PHILIPS N.V., Eindhoven (NL)

(72) Inventors: Niels Schipper, Groningen (NL); Mahantesh Bhoomaraddi, Ramdurg (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 367 days.

(21) Appl. No.: 18/683,373

(22) PCT Filed: Aug. 9, 2022

(86) PCT No.: PCT/EP2022/072317
§ 371 (c)(1),
(2) Date: Feb. 13, 2024

(87) PCT Pub. No.: WO2023/020889
PCT Pub. Date: Feb. 23, 2023

(65) Prior Publication Data

US 2024/0347963 A1 Oct. 17, 2024

(30) Foreign Application Priority Data

Aug. 19, 2021 (EP) .................................... 21192122

(51) Int. Cl.
*H01R 13/52* (2006.01)
*B26B 21/40* (2006.01)
*H01R 43/00* (2006.01)

(52) U.S. Cl.
CPC ....... *H01R 13/5202* (2013.01); *B26B 21/405* (2013.01); *H01R 13/5219* (2013.01); *H01R 43/005* (2013.01)

(58) Field of Classification Search
CPC ............ H01R 13/5202; H01R 13/5219; H01R 13/6315; H01R 43/005; B26B 21/405
(Continued)

(56) References Cited

U.S. PATENT DOCUMENTS 5,284,448 A 2/1994 Hussmann et al.
5,685,727 A * 11/1997 Cairns ................. H01R 13/523 439/271

(Continued)

FOREIGN PATENT DOCUMENTS

CN 202817345 U 3/2013
CN 205009272 U 2/2016

(Continued)

OTHER PUBLICATIONS

International Search report and Written Opinion of PCT/EP2022/072317, dated Nov. 18, 2022.

*Primary Examiner* — Gary F Paumen

(57) ABSTRACT

According to an aspect, there is provided an electronic connection module for mounting within an electronic device, the electronic connection module comprising: a connection port comprising a connector and a first sealing ring disposed on an outer surface of the connector at an open end of the connector, the open end being configured to receive a mating connector; an intermediate housing configured to receive the connection port, the intermediate housing comprising an inner surface against which the first sealing ring of the connection port interfaces to provide a seal between the inner surface of the intermediate housing and the connection port; a module housing configured to receive the intermediate housing and the connection port; a biasing unit disposed between the module housing and the connection port, the biasing unit configured to bias the connection port towards a shelf of the intermediate housing such that the open end of the connection port abuts the shelf
(Continued)

of the intermediate housing to secure the connection port within the intermediate housing; and an O-ring disposed on an outer surface of the intermediate housing for interfacing with an inner surface of the electronic device, the O-ring being disposed between a ledge projecting from an outer surface of the intermediate housing and the module housing.

14 Claims, 5 Drawing Sheets

(58) Field of Classification Search
USPC .......................................... 439/271, 247, 248
See application file for complete search history.

(56) References Cited

U.S. PATENT DOCUMENTS

| | | | | |
|---|---|---|---|---|
| 10,952,343 | B2 * | 3/2021 | Kawai .................... | H05K 5/069 |
| 12,230,913 | B2 * | 2/2025 | Enomoto ............... | H01R 31/06 |

FOREIGN PATENT DOCUMENTS

| | | | |
|---|---|---|---|
| CN | 209474838 | U | 10/2019 |
| CN | 212011416 | U | 11/2020 |
| DE | 102016101506 | A1 | 8/2017 |
| WO | 2020014955 | A1 | 1/2020 |

* cited by examiner

ELECTRONIC CONNECTION MODULE

CROSS-REFERENCE TO PRIOR APPLICATIONS

This application is the U.S. National Phase application under 35 U.S.C. § 371 of International Application No. PCT/EP2022/072317, filed on Aug. 9, 2022, which claims the benefit of European Patent Application No. 21192122.6, filed on Aug. 19, 2021. These applications are hereby incorporated by reference herein.

FIELD OF THE INVENTION

The invention relates to an electronic connection module for mounting within an electronic device, an electric hair trimming appliance, a kit of parts for assembling the electronic connection module, and a method of assembling the electronic connection module.

BACKGROUND OF THE INVENTION

Electronic connectors for electronic devices, such as an electric hair trimming appliance, typically require waterproof mountings in the electronic device. For some electronic connectors, such as USB-C type connectors, the seals provided are usually small and less reliable than is desirable. CN 212011416 discloses a waterproof USB charging interface assembly for an electric shaver. Wherein the USB charging interface and the conductive column are installed on the PCB, and the plastic seat is integrally fixed to the periphery of the USB charging interface, the periphery of the PCB and the periphery of the conductive column in a sleeving mode. A port of the USB charging interface is exposed out of the lower end face of the plastic seat, and the plastic seat is inserted and fixed into an installation groove formed in the lower end of the electric shaver and makes close contact with the installation groove. The sealing cover is fixed at the opening of the lower end of the mounting groove and covers the lower end of the plastic seat, and the port of the USB charging interface is in butt joint with the window of the sealing cover.

SUMMARY OF THE INVENTION

According to a first specific aspect, there is provided a n electronic connection module for mounting within an electronic device, the electronic connection module comprising: a connection port comprising a connector and a first sealing ring disposed on an outer surface of the connector at an open end of the connector, the open end being configured to receive a mating connector; an intermediate housing configured to receive the connection port, the intermediate housing comprising an inner surface against which the first sealing ring of the connection port interfaces to provide a seal between the inner surface of the intermediate housing and the connection port; a module housing configured to receive the intermediate housing and the connection port; a biasing unit disposed between the module housing and the connection port, the biasing unit configured to bias the connection port towards a shelf of the intermediate housing such that the open end of the connection port abuts the shelf of the intermediate housing to secure the connection port within the intermediate housing; and an O-ring disposed on an outer surface of the intermediate housing for interfacing with an inner surface of the electronic device, the O-ring being disposed between a ledge projecting from an outer surface of the intermediate housing and the module housing.

The intermediate housing may comprise a recess in the inner surface for receiving the first sealing ring.

The biasing unit may be integral with the module housing. The biasing unit may be in the form of a pre-tensioned leaf-spring. The biasing unit may be composed of polycarbonate or steel. The biasing unit may have a stiffness such that it resists deformation for a force being applied which is required to insert a mating connector in the connection port.

The module housing may be composed of polycarbonate or steel.

The shelf on the inner surface of the intermediate housing and the ledge on the outer surface of the intermediate housing may be opposing such that the O-ring is disposed on the outer surface of the intermediate housing directly opposing the first sealing ring of the connection port on the inner surface of the intermediate housing.

The module housing may be configured to snap fit together with the intermediate housing.

The connection port may be a USB-C port. The connector may be a USB-C connector.

According to a second aspect, there is provided an electric hair trimming appliance comprising the electronic connection module according to the first aspect.

According to a third aspect, there is provided a kit of parts for an electronic connection module according to the first aspect, the kit of parts comprising: the connection port including the connector and the first sealing ring, the intermediate housing, the module housing, the biasing unit, and the O-ring.

According to a fourth aspect, there is provided a method of assembling an electronic connection module according to the first aspect, the method comprising: inserting the connection port through an open end of the intermediate housing until the open end of the connection port abuts the shelf of the intermediate housing opposing the open end of the housing; adding the O-ring to the outer surface of the intermediate housing against the ledge of the intermediate housing; inserting the intermediate housing with the connection port and O-ring into the module housing until the O-ring is secured between the module housing and the ledge of the intermediate housing, and such that the biasing unit is disposed between the module housing and the connection port, and such that the biasing unit biases the connection port against the shelf of the intermediate housing; and securing the module housing to the intermediate housing.

Securing the module housing to the intermediate housing may comprise connecting the module housing with a snap fit connection to the intermediate housing.

The connection port may be inserted though the open end of the intermediate housing until the first sealing ring is received in the recess of the intermediate housing.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

Figure 1:
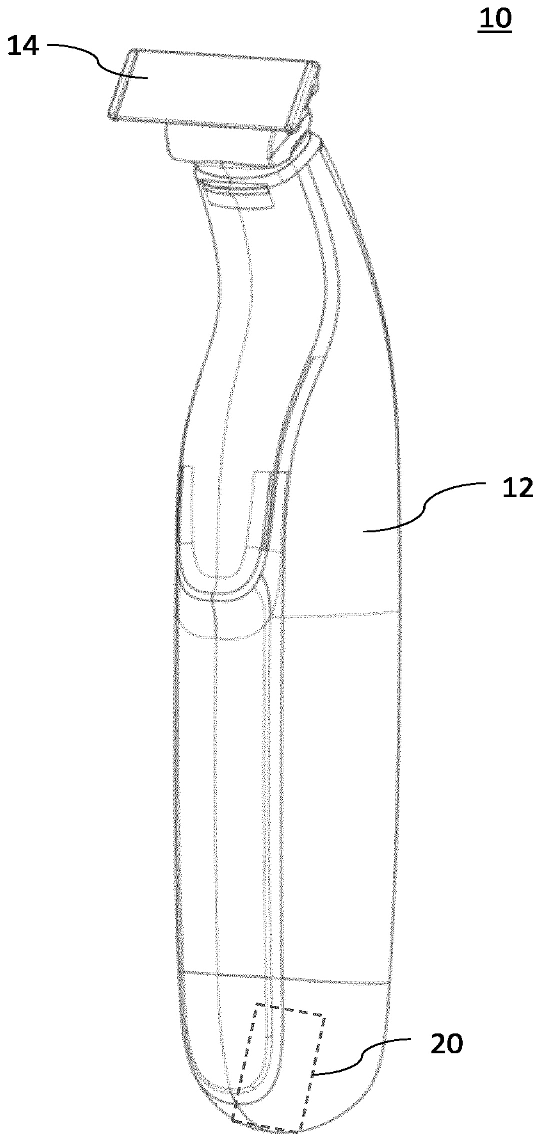
FIG. 1 schematically shows an electric hair trimming device.

FIG. 1 shows an electric hair trimming appliance 10 comprising a handle 12 and a trimming unit 14. The handle 12 comprises an electric motor (not shown) which is connected to the trimming unit 14, so as to reciprocate a blade for cutting hair. The electric motor is powered by a battery in this example, which requires charging.

The electric hair trimming appliance 10 comprises an electronic connection module 20 which is disposed in the handle 12 and which comprises a USB-C type connector (best shown in FIG. 4) for connecting to a mating charger to charge the battery. In other examples, the connector may be any type of electronic connector, and may be to power the motor directly, rather than to charge a battery, or may be for data transfer.

Figure 2:
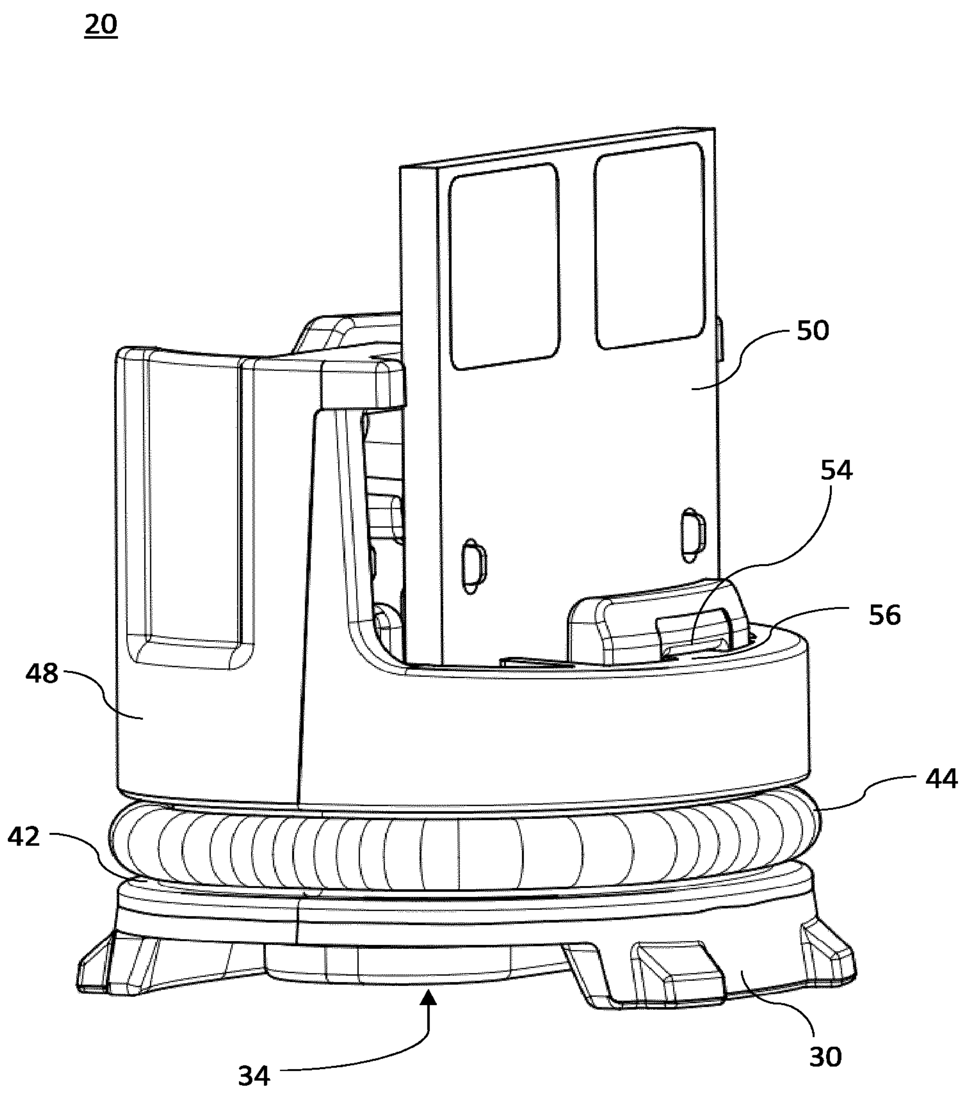
FIG. 2 schematically shows an isometric view of an electronic connection module.
Figure 3:
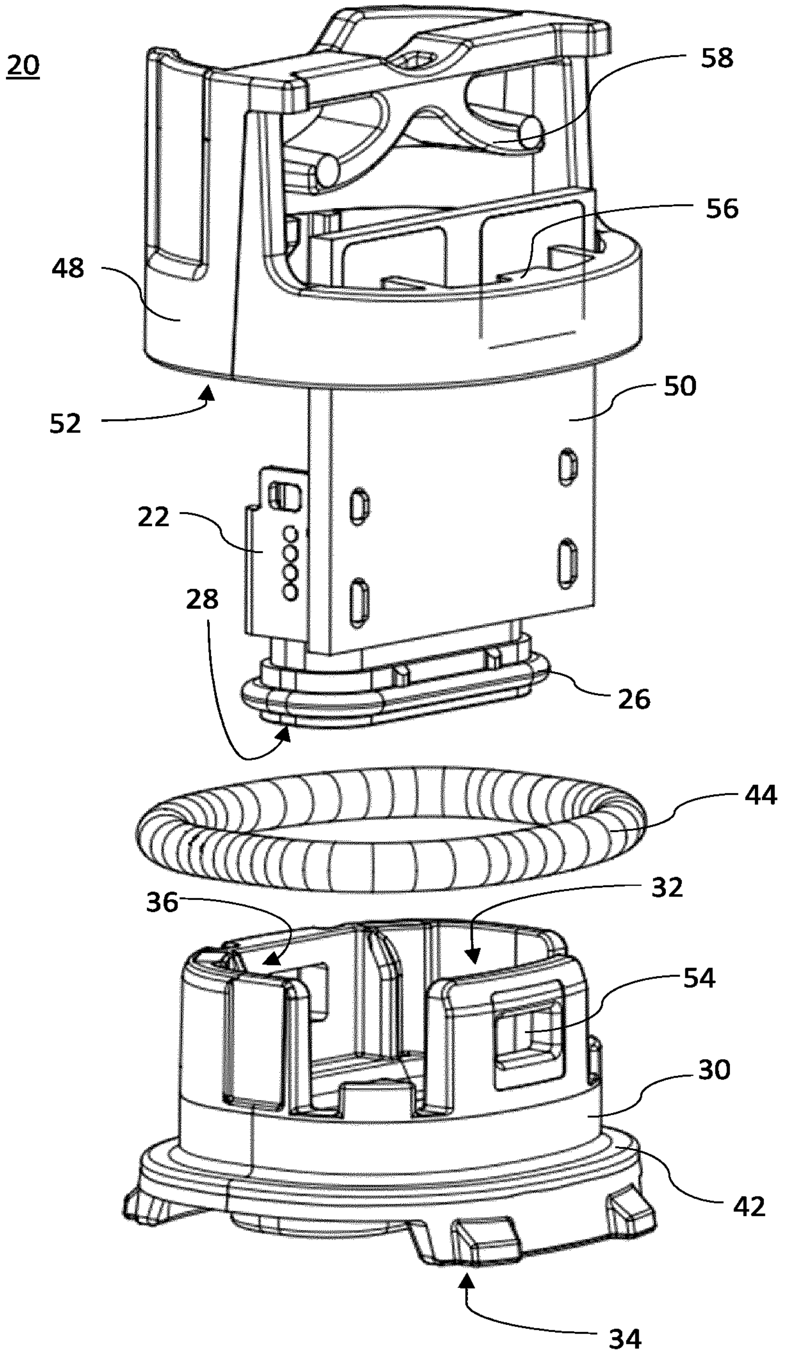
FIG. 3 schematically shows an exploded view of the electronic connection module.
Figure 4:
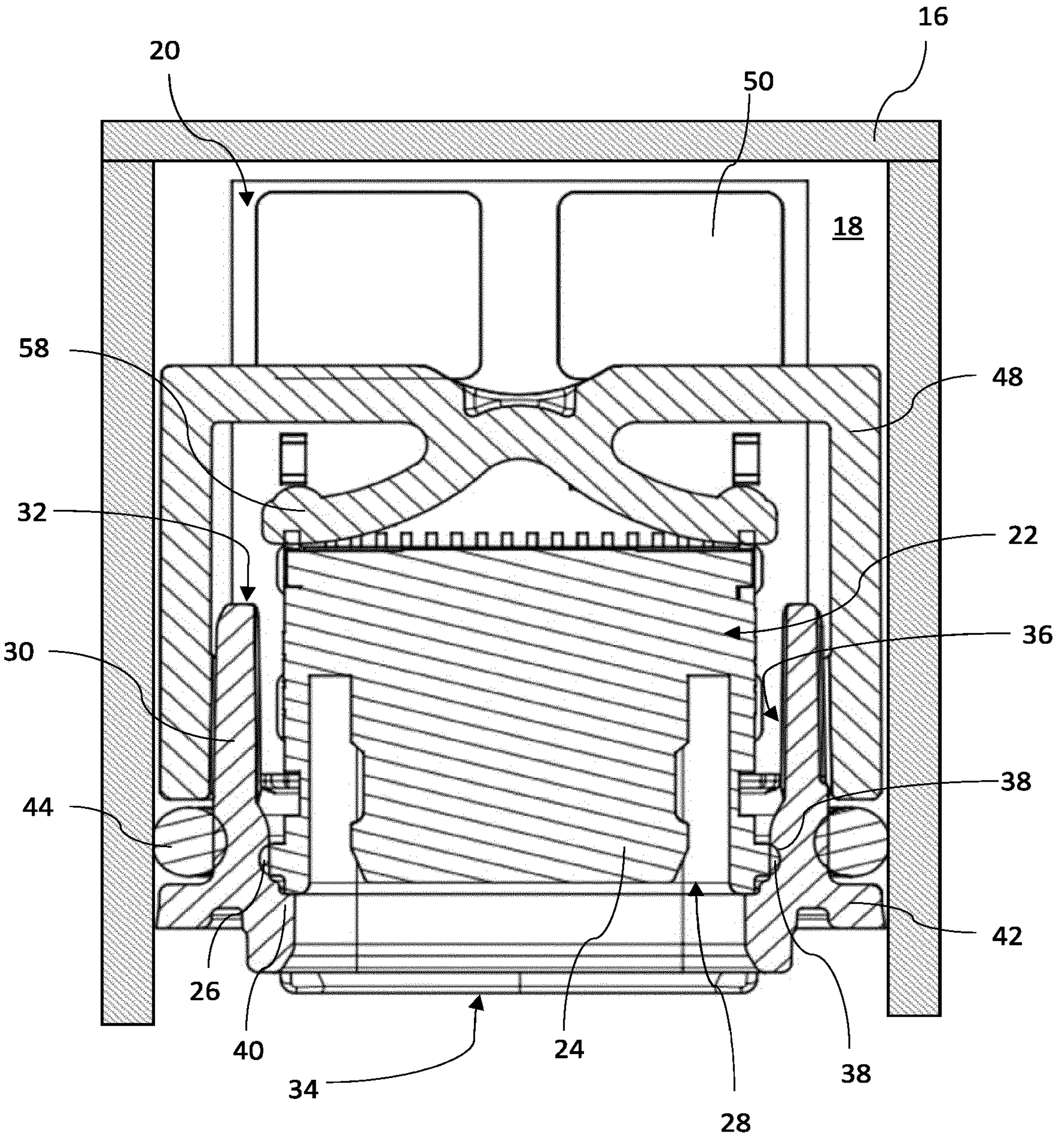
FIG. 4 schematically shows a cross-sectional view of the electronic connection module inside a cavity of an electric hair trimming device.

FIGS. 2 and 3 respectively show an isometric view and an exploded view of the electronic connection module 20, and FIG. 4 shows a cross-sectional view of the electronic connection module 20 disposed within a cavity 18 of the electric hair trimming appliance 10, defined by internal walls 16 of the electric hair trimming appliance 10.

The electronic connection module 20 comprises a USB-C connection port 22 comprising a USB-C connector 24 (best shown in FIG. 4) and a first sealing ring 26. It may be, for example, an off-the-shelf waterproof USB-C connection port. The connector 24 comprises an open end 28 which is configured to receive a mating connector, and the first sealing ring 26 is disposed on an outer surface of the connector 24. In other examples, the connector may be any type of connector, such as a USB-A connector, which is configured to mate with a corresponding connector.

In this example, the connection port 22 further comprises a PCB board 50 which is connected to the outer surface of the connector 24 and extends away from the open end 28 of the connector 24 and beyond an opposing end of the connector 24.

The electronic connection module 20 further comprises an intermediate housing 30 which is configured to receive the connection port 22. The intermediate housing 30 comprises an open end 32 through which the open end 28 of the connection port 22 is inserted, and a shelf end 34 opposing the open end 32. The shelf end 34 is also open, to provide access from outside the intermediate housing 30 to the connector 24 for the mating connector.

Walls of the intermediate housing 30 extend between the shelf end 34 and the open end 32, forming an intermediate cavity in which the connection port 22 is disposed, and defining an inner surface 36 against which the first sealing ring 26 of the connection port 22 interfaces to provide a continuous seal between the intermediate housing 30 and the connection port 22.

In this example, a recess 38 in the inner surface 36 extends around the intermediate housing 30 to receive the first sealing ring 26. Having the first sealing ring 26, which is typically very small on an off-the-shelf connection port, guided along the inner surface 36 to be received within the recess 38, ensures that the first sealing ring 26 is surrounded on more sides of its cross-section, which helps to prevent warping of the first sealing ring 26, and thereby provides a more reliable seal. In other words, first sealing ring 26 provides radial sealing between the intermediate housing 30 and the connector 24, and the recess 38 also provides an axial stop for the first sealing ring 26 against the surface of the recess 38 which wraps around the first sealing ring in an axial direction such that it prevents warping of the first sealing ring 26, thereby improving the sealing performance of the first sealing ring 26. In other examples, there is no recess in the inner surface, and the first sealing ring merely interfaces with the inner surface, thereby providing radial sealing.

The intermediate housing 30 further comprises a shelf 40 protruding into the cavity of the intermediate housing 30 at the shelf end 34. The open end 28 of the connection port 22 is configured to abut the shelf 40 to prevent further insertion of the connection port 22 into the intermediate housing 30, whilst enabling access to the connector 24 for a mating connector. In other words, the shelf 40 acts as the axial end stop for the connector 24.

The intermediate housing 30 also comprises a ledge 42 extending from an outer surface of the intermediate housing 30 around the extent of the intermediate housing 30 on which an O-ring 44 is configured to sit on the outer side of the intermediate housing 30.

The O-ring 44 is configured to interface with an inner surface of the walls 16 of the electronic hair trimming appliance (as shown in FIG. 4) to provide a seal between the intermediate housing 30 and the walls 16 of the electric hair trimming appliance 10. The O-ring can be of any suitable size to provide the required sealing performance.

The electronic connection module 20 further comprises a module housing 48 which is configured to receive the intermediate housing 30 and the connection port 22 through an open end 52 of the module housing 48. The open end 52 of the module housing 48 comprises a profile matching a profile of the ledge 42 on the intermediate housing 30, so that the O-ring 44 on the outer surface of the intermediate housing 30 is sandwiched between the ledge 42 and the module housing 48.

In this example, the shelf 40 and the ledge 42 on the intermediate housing 30 are positioned to oppose one another, such that the O-ring 44 is positioned directly opposing the first sealing ring 26 when the connection port 22 abuts the shelf 40. Having the first sealing ring 26 directly opposing the O-ring 44 means that the radial forces acting on the intermediate housing 30 from the first sealing ring 26 and the O-ring 44 are directly opposing, such that there is no or minimal moment applied to the intermediate housing 30, thereby reducing the stiffness required for the wall of the intermediate housing 30.

The intermediate housing 30 and the module housing 48 are secured together with a snap fit connection. Specifically, the intermediate housing 30 comprises apertures 54 in the walls of the intermediate housing 30 which cooperate with tabs 56 on the module housing 48. It will be appreciated that in other examples, the module housing may comprise the apertures, and the intermediate housing may comprise the cooperating tabs of the snap fit connection.

The snap fit connection is configured to secure the O-ring 44 between the ledge 42 and the module housing 48, so as to provide a reliable seal between the intermediate housing 30 and the module housing 48. The ledge 42 and the module housing 48 thereby provide axial stops for the O-ring 44 to prevent axial movement of the O-ring 44. This snap fit connection improves ease and speed of assembly as no screws or other external securing components, or steps, are required.

The electronic connection module 20 further comprises a biasing unit 58 which, in this example, is integral with the module housing 48. The biasing unit 58 is disposed between the module housing 48 and the connection port 22, and is configured to bias the connection port 22 towards the shelf 40 of the intermediate housing 30, such that the open end 28 of the connection port 22 abuts the shelf 40. This secures the connection port 22 within the intermediate housing 30, and within the module housing 48 since the shelf 40 provides the end stop to prevent further insertion of the connection port 22 into the intermediate housing 30, and the biasing unit 58 prevents the connection port 22 from coming out of the intermediate housing 30 thereby squeezing the connection port 22 between the module housing 48 and the shelf 40. In other examples, the biasing unit may be separate from the module housing 48.

In this example, the biasing unit 58 has a stiffness such that it resists deformation for a force being applied which is required to insert a mating connector in the connection port 22. Biasing the connection port 22 against the intermediate housing 30 with a biasing unit 58 having this stiffness ensures that the connection port 22 remains in contact with the intermediate housing 30, even during plugging and unplugging of a mating connector, such that the first sealing ring 26 remains disposed within the recess. This improves sealing performance of the first sealing ring 26. If the biasing unit 58 has a stiffness lower that this, so that it deforms slightly upon insertion of a mating connector into the connection port 22, the first sealing ring 26 may move out of the recess 38, but it will still seal against the inner surface 36 of the intermediate housing 30.

Further, having the O-ring 44, which can be of any suitable size significantly larger than the first sealing ring 26, disposed between the intermediate housing 30 and walls 16 of an electronic hair trimming appliance also improves the sealing performance of the electronic connection module 20 as a whole. Therefore, the configuration of the electronic connection module 20 improves sealing performance, particularly, for examples which use off-the-shelf USB-C connection ports having small first sealing rings.

The biasing unit 58 in this example is in the form of a pretensioned leaf spring. Having the biasing unit 58 disposed between the connection port 22 and the module housing 48 means that the dimensional tolerances are increased, since the connection port 22 will always be squeezed between the shelf 40 and the module housing 48, thereby ensuring that the manufactured dimensions of the parts do not have to be as accurate.

Further, the O-ring 44 is received in a space between the module housing 48 and the intermediate housing 30, and this space must be large enough to accommodate the O-ring 44 which is sealed against the wall 16 of the electric hair trimming appliance 10, and deformed axially according to the Poisson effect. The module housing 48 should not impede the deformation of the O-ring 44 according to the Poisson effect, such that there is a minimum distance between the module housing 48 and the intermediate housing 30 when they are snap fit together, determined by the size of the O-ring 44, but there is a large tolerance on the maximum distance between the module housing 48 and the intermediate housing 30.

The biasing unit 58 in this example is composed of polycarbonate. Polycarbonate exhibits very low creep over time, which makes it a good material for the biasing unit 58, which must be able to produce a large force to overcome plugging and unplugging actions of the mating connector to the connector 24 of the connection port 22. It also has the benefit of being lightweight and easy to mould. Typically, polycarbonate cannot be used in equipment suitable for use in wet environments, since exposure to chemicals significantly degrades the polycarbonate. However, the superior sealing of the electronic connection module 20 means that this material can be used safely.

Since the biasing unit 58 in this example is unitary with the module housing 48, and the module housing 48 is also protected from external conditions by the improved sealing of the electronic connection module 20, the module housing 48 is also made of polycarbonate. In some examples, the biasing unit may be separate from the module housing and/or the module housing may be composed of a different material.

In other examples, the biasing unit and/or the module housing may be composed of steel, which also exhibits very low creep over time, or any other suitable material.

Although the electronic connection module 20 is described as being inserted in a cavity 18 of an electric hair trimming appliance 10, it will be appreciated that the electronic connection module 20 may be inserted into a cavity in any suitable electronic device, where the O-ring is configured to interface with the walls of the electronic device defining the cavity to seal the cavity.

Figure 5:
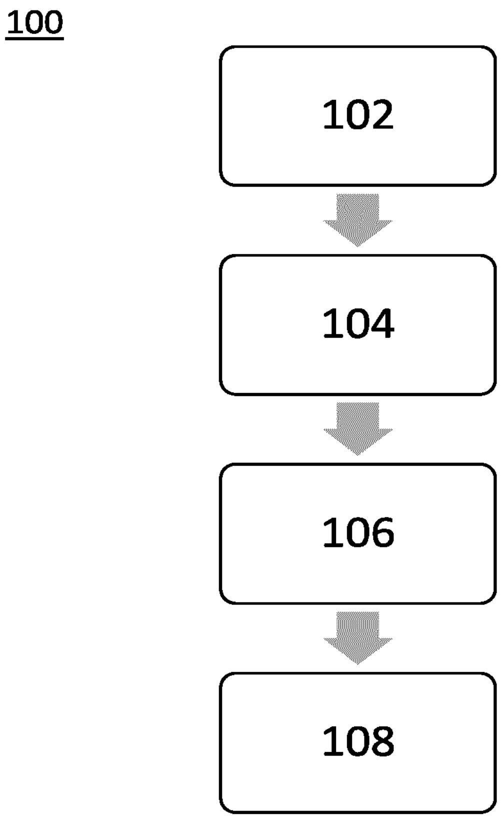
FIG. 5 is a flow chart showing steps of a method of assembling the electronic connection module.

FIG. 5 is a flow chart showing steps of a method 100 of assembling the electronic connection module 20.

In block 102, the method 100 comprises inserting the connection port 22 through an open end 32 of the intermediate housing 30 until the open end 28 of the connection port 22 abuts the shelf 40 of the intermediate housing 30, and until the first sealing ring 26 is received within the recess 38 of the intermediate housing 30. It will be appreciated that, in examples where there is no recess in the inner surface of the intermediate housing, the first sealing ring will not be received in the recess.

In block 104, the method 100 comprises adding the O-ring 44 to the outer surface of the intermediate housing 30 against the ledge 42 of the intermediate housing 30. It will be appreciated that block 104 can be carried out before block 102.

In block 106, the method 100 comprises inserting the intermediate housing 30 with the connection port 22 and O-ring 44 into the module housing 48 until the biasing unit 58 biases the connection port 22 against the shelf 40.

In other examples, where there biasing unit is separate from the module housing, the method may comprise inserting the biasing unit into the module housing before inserting the intermediate housing with the connection port and the O-ring into the module housing, to ensure that the biasing port is disposed between the module housing and the connection port.

In block 108, the method 100 comprises securing the module housing 48 to the intermediate housing 30 with the snap fit connection by inserting the intermediate housing 30 with the connection port 22 and the O-ring 44 into the module housing 48 until the tabs 56 of the module housing 48 snap into the apertures 54 of the intermediate housing 30. In other examples, it may include securing the module housing to the intermediate housing with screws, adhesive, or any other suitable means.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An electronic connection module for mounting within an electronic device, the electronic connection module comprising:

a connection port comprising a connector and a first sealing ring disposed on an outer surface of the connector at an open end of the connector, the open end being configured to receive a mating connector;

an intermediate housing configured to receive the connection port, the intermediate housing comprising an inner surface against which the first sealing ring of the connection port interfaces to provide a seal between the inner surface of the intermediate housing and the connection port;

a module housing configured to receive the intermediate housing and the connection port;

a biasing unit disposed between the module housing and the connection port, the biasing unit configured to bias the connection port towards a shelf of the intermediate housing such that the open end of the connection port abuts the shelf of the intermediate housing to secure the connection port within the intermediate housing; and an O-ring disposed on an outer surface of the intermediate housing for interfacing with an inner surface of the electronic device, the O-ring being disposed between a ledge projecting from an outer surface of the intermediate housing and the module housing.

2. An electronic connection module according to claim 1, wherein the intermediate housing comprises a recess in the inner surface for receiving the first sealing ring.

3. An electronic connection module according to claim 1- or 2, wherein the biasing unit is integral with the module housing.

4. An electronic connection module according to claim 1, wherein the biasing unit is in the form of a pre-tensioned leaf-spring.

5. An electronic connection module according to claim 1, wherein the biasing unit is composed of polycarbonate or steel.

6. An electronic connection module according to claim 1, wherein the module housing is composed of polycarbonate or steel.

7. An electronic connection module according to claim 1, wherein the shelf on the inner surface of the intermediate housing and the ledge on the outer surface of the intermediate housing are opposing such that the O-ring is disposed on the outer surface of the intermediate housing directly opposing the first sealing ring of the connection port on the inner surface of the intermediate housing.

8. An electronic connection module according to claim 1, wherein the module housing is configured to snap fit together with the intermediate housing.

9. An electronic connection module according to claim 1, wherein the connection port is a USB-C port and wherein the connector is a USB-C connector.

10. An electric hair trimming appliance comprising the electronic connection module according to claim 1.

11. A kit of parts for an electronic connection module according to claim 1, the kit of parts comprising:

the connection port including the connector and the first sealing ring, the intermediate housing, the module housing, the biasing unit, and the O-ring.

12. A method of assembling an electronic connection module according to claim 1, the method comprising:

inserting the connection port through an open end of the intermediate housing until the open end of the connection port abuts the shelf of the intermediate housing opposing the open end of the housing;

adding the O-ring to the outer surface of the intermediate housing against the ledge of the intermediate housing;

inserting the intermediate housing with the connection port and O-ring into the module housing until the O-ring is secured between the module housing and the ledge of the intermediate housing, and such that the biasing unit is disposed between the module housing and the connection port, and such that the biasing unit biases the connection port against the shelf of the intermediate housing; and securing the module housing to the intermediate housing.

13. A method according to claim 12, wherein securing the module housing to the intermediate housing comprises connecting the module housing with a snap fit connection to the intermediate housing.

14. A method according to claim 12, wherein the connection port is inserted though the open end of the intermediate housing until the first sealing ring is received in the recess of the intermediate housing.

* * * * *